(12) United States Patent
Ignatowski et al.

(10) Patent No.: US 7,099,816 B2
(45) Date of Patent: Aug. 29, 2006

(54) METHOD, SYSTEM AND ARTICLE OF MANUFACTURE FOR AN ANALYTIC MODELING TECHNIQUE FOR HANDLING MULTIPLE OBJECTIVES

(75) Inventors: Michael Ignatowski, Red Hook, NY (US); Noshir Cavas Wadia, Morgan Hill, CA (US); Peng Ye, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 10/174,030

(22) Filed: Jun. 17, 2002

(65) Prior Publication Data

US 2003/0233220 A1 Dec. 18, 2003

(51) Int. Cl.
G06F 9/455 (2006.01)
G06F 13/00 (2006.01)
(52) U.S. Cl. .............................. 703/22; 703/2; 703/21; 703/25; 709/235; 710/21
(58) Field of Classification Search .................. 703/2, 703/21, 23, 25, 22; 710/21; 709/235
See application file for complete search history.

(56) References Cited

U.S. PATENT DOCUMENTS

| | | | | |
|---|---|---|---|---|
| 5,088,058 A | * | 2/1992 | Salsburg ....................... 703/25 |
| 5,640,596 A | * | 6/1997 | Takamoto et al. ............. 710/21 |
| 5,764,961 A | | 6/1998 | Bhat .......................... 395/500 |
| 5,790,425 A | | 8/1998 | Wagle .................... 364/551.01 |
| 5,819,033 A | | 10/1998 | Caccavale ............. 395/200.11 |
| 5,881,268 A | * | 3/1999 | McDonald et al. ........... 703/21 |
| 5,991,705 A | | 11/1999 | Klein et al. ................. 702/176 |
| 6,003,047 A | | 12/1999 | Osmond et al. ............ 707/513 |
| 6,003,083 A | | 12/1999 | Davies et al. .............. 709/226 |
| 6,014,697 A | | 1/2000 | Lewis et al. ................ 709/223 |
| 6,059,842 A | | 5/2000 | Dumarot et al. .............. 717/11 |
| 6,070,190 A | | 5/2000 | Reps et al. .................. 709/224 |
| 6,086,617 A | | 7/2000 | Waldon et al. ................. 703/2 |
| 6,110,214 A | | 8/2000 | Klimasauskas ................ 703/2 |
| 6,141,759 A | | 10/2000 | Braddy ....................... 713/201 |
| 6,704,804 B1 | * | 3/2004 | Wilson et al. .............. 719/315 |
| 6,789,050 B1 | * | 9/2004 | Reeser et al. .................. 703/2 |
| 2004/0064577 A1 | * | 4/2004 | Dahlin et al. ............... 709/235 |

\* cited by examiner

Primary Examiner—Thai Phan
(74) Attorney, Agent, or Firm—Kunzler & Associates

(57) ABSTRACT

The present invention discloses a method, system and article of manufacture for performing analytic modeling on a computer system by handling a plurality of predefined system criteria directed to a modeled computer system. The present invention provides means for the user of an analytic model to specify (i.e. enable) any number of predefined system criteria that must all be simultaneously satisfied. The modeling methodology uses a variation of the well-known Mean Value Analysis technique in its calculations. Response times, resource utilizations, and resource queue lengths are initially estimated for a small user arrival rate. An iterative method is used to gradually increase the user arrival rate by a constant value. For each iteration, response times, resource utilizations, and resource queue lengths are calculated. Then for all the criteria, which have been enabled, it is checked to see if the value limits specified for those criteria have exceeded. If not, the model calculation results are saved and next iteration is started. The model iterations continue with a gradually increasing user arrival rate until one or more of the modeling criteria are exceeded. At that time the model outputs the results from the previous iteration (i.e. the saved results where all the criteria were still satisfied), and the modeling calculations are finished. The model results may be used as input for further processing.

31 Claims, 4 Drawing Sheets

METHOD, SYSTEM AND ARTICLE OF MANUFACTURE FOR AN ANALYTIC MODELING TECHNIQUE FOR HANDLING MULTIPLE OBJECTIVES

CROSS-REFERENCE TO RELATED APPLICATION

This application is related to the following which is incorporated by reference herein:

IBM Application Ser. No. 10/126,245, entitled "METHOD AND SYSTEM OF AN INTEGRATED SIMULATION TOOL USING BUSINESS PATTERNS AND SCRIPTS," filed on Apr. 18, 2002,by Mike Ignatowski and Noshir Wadia, the same inventors as this application.

FIELD OF THE INVENTION

The present invention relates generally to an analytic modeling technique for handling multiple objectives, and more particularly to a method and system of an analytic modeling technique for simultaneously satisfying any number of predefined system criteria.

BACKGROUND OF THE INVENTION

As e-business and its related requirements grow at "Web speed", a critical issue is whether the IT infrastructure supporting the Web sites has what it needs to provide available, scalable, fast, and efficient access to the company's information, products, and services. More than ever, CIOs (Chief Information Officers) and their teams struggle with the challenges to minimize downtime and network bottlenecks and maximize the use of the hardware and software that comprises their e-business infrastructure.

Although even with this growing complexity, typical IT infrastructures can be analyzed and related models can be developed to assist in predicting and planning how to meet future requirements, the results are not satisfactory. The predictions can become somewhat complex when, as is often the case, there is a number of performance criteria that must all be simultaneously met, while at the same time maximizing system throughput or the number of concurrent users supported by the system.

Capacity planning and performance modeling of complex computer systems generally require detailed information about the workload assumed to be running on those systems. For detailed performance studies of processors, a trace of the workload is typically used. This, combined with the right model of the processor hardware can be used to accurately estimate the average number of cycles used per instruction. Combining this with the processor cycle time leads to an accurate estimate for the processor MIPS (Million Instructions Per Second).

For higher-level system modeling where the user throughput rate is to be estimated, the processor MIPS rate is typically taken as an input assumption for the model. This, combined with the path length (i.e. number of instructions executed by a typical user) can be used to estimate the system throughput in terms of the number of users per second that can be served. Additional factors, such as the average number of network bytes transferred, or disk I/O operations done per user can also be factored into the calculations.

Given adequate information about the workload, a simple capacity planning can be done by calculating the number of users per second that corresponds to a chosen utilization of some system resources (i.e. processors, disks, network). Typical utilization targets might be 30% average processor utilization, or 50% average disk utilization. More detailed estimates that project the overall response time per user (factoring in queuing effects on various resources) can also be made using well known Mean Value Analysis techniques. This can be applied in an iterative fashion gradually increasing the user arrival rate to the system until the projected response time reaches to the predefined limit.

While these types of system analysis do not require detailed instruction traces, they still require path length, disk 10, and network data rates for the average user. Often times this information can be obtained from measurements or traces. However, for many studies of new workloads in the rapidly emerging world of web serving and e-Business, such data often does not exist due to the newness of the workloads, or because projections are needed for an application that has not yet been developed.

What is needed is a modeling technique for simultaneously satisfying multiple objectives of a computer system (i.e. system criteria) without requiring a detailed knowledge of the workload characteristics. The user of a system performance modeling tool embodying such modeling technique is allowed to specify any number of system criteria that must all be simultaneously met. Typical examples of such system criteria are: maximum allowed utilizations for various resources in the system, maximum overall response time, maximum number of users simultaneously in the system, and maximum average queue length at any resource in the system. The modeling technique may be used to find, for example, the maximum user arrival rate that meets all specified system criteria (i.e. objectives).

SUMMARY OF THE INVENTION

The present invention discloses a method, system and article of manufacture for performing analytic modeling on a computer system by handling a plurality of predefined system criteria directed to a modeled computer system. Initially, one or more predefined system criteria are enabled. Next, a maximum allowed value for each of the enabled predefined system criteria is established. A plurality of variables used in mean value analysis calculations for the analytic modeling is then initialized. A value for each of the enabled predefined system criteria is calculated utilizing those variables. Each of the calculated values is then compared to its corresponding maximum allowed value. If none of the calculated values have exceeded their corresponding maximum allowed value, the calculated values are saved, the variables are adjusted and new values are calculated. This process continues until one or more of the enabled predefined system criteria have exceeded their maximum allowed value. The saved calculated values are treated as the model results, displayed and/or used as input for further processing.

In another embodiment of the present invention, the above-described analytic modeling method may be provided as a computer system. The present invention may also be provided as an article of manufacture comprising a program storage device readable by a computer system and tangibly embodying one or more programs of instructions executable by the computer system to perform the above-described analytic modeling method steps.

The present invention provides means for the user of an analytic model to specify any number of predefined system criteria that must all be simultaneously satisfied. This will typically consist of an input panel from the user interface to the model that contains the predefined system criteria. For each criterion, an option button (or similar device) on that input panel can be used to enable or disable that criterion. At least one criterion must be enabled for the model to run, though any number of multiple criteria can be simultaneously enabled. Also on the input panel, each criterion will typically include a descriptive label and an input field to specify a maximum allowed value. These input fields will typically be initialized to a default value, which the model user can accept or modify.

The modeling methodology uses a variation of the well-known Mean Value Analysis technique in its calculations. Response times, resource utilizations, and resource queue lengths are initially estimated for a small user arrival rate. An iterative method is used to gradually increase the user arrival rate by a constant value (i.e. a fixed value). For each iteration, response times, resource utilizations, and resource queue lengths are calculated. Then for all the criteria, which have been enabled, it is checked to see if the value limits specified for those criteria have exceeded. If not, the model calculation results are saved and next iteration is started.

The model iterations continue with a gradually increasing user arrival rate until one or more of the modeling criteria are exceeded. At that time the model outputs the results from the previous iteration (i.e. the one where all the criteria are still satisfied), and the modeling calculations are finished. The model results may be used as input for further processing.

BRIEF DESCRIPTION OF THE DRAWINGS

The present invention will become more apparent to those of ordinary skill in the art after considering the preferred embodiments described herein with reference to the attached drawings in which like reference numbers represent corresponding elements throughout.

DETAIL DESCRIPTION OF THE PREFERRED EMBODIMENT

In the following description of the preferred embodiment, reference is made to the accompanying drawings which form a part thereof, and which is shown by way of illustration a specific embodiment in which the present invention may be practiced. It is to be understood that other embodiments may be utilized as structural changes may be made without departing from the scope of the present invention.

Hardware Environment

Figure 1:
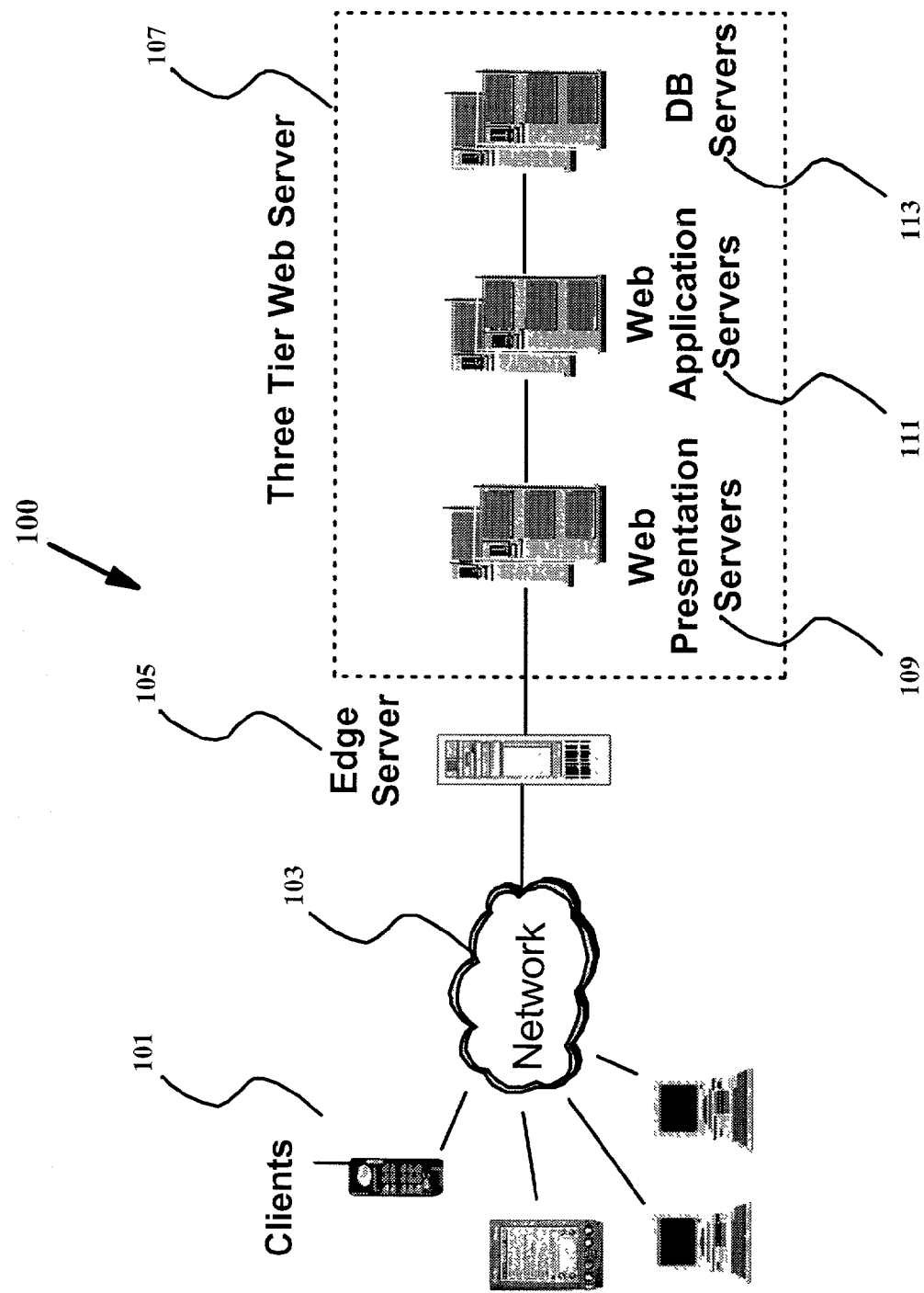
FIG. 1 illustrates an exemplary computer hardware environment that may be used in accordance with the present invention.

FIG. 1 illustrates an exemplary computer hardware environment (i.e. a sample computer system) that may be used in accordance with the present invention. In the exemplary environment, the infrastructure 100 supporting most high volume web sites typically has multiple components which include clients 101, the network 103, a special purpose server called edge server 105, and one or more computer systems with multiple layers of server machines 109, 111 and 113 within the web server 107. These multiple server machine layers are frequently called tiers, with each tier handling a particular set of functions such as serving content (i.e. web presentation servers 109), providing integration business logic (i.e. web application servers 111), or processing database transactions (i.e. database servers 113).

The clients 101 are devices that serve as the interface to the user. For example, the clients comprise a personal computer running a web browser, or a wireless device for mobile users. The type of client determines the delay associated with the client software operations for sending and receiving requests to the web server 107.

The network 103, for example the Internet, is modeled as a generic delay associated with transferring data between the web server 107 and the client 101. Specific queuing delays along the network 103, and the effects of caching and content serving within the network 103 are not modeled.

The edge server 105 is typically a special purpose server acting as an interface between the network 103 and the rest of the web server 107. It can be implemented as a single server or multiple servers acting in parallel. The edge server 105 may implement any or all of the following functions: Firewall—which implements security features, Network Dispatcher—which routes incoming requests to multiple server nodes in the next tier, and Content Caching—which holds cached copies of common content files (e.g. html, jpeg, etc.) and supplies them directly to clients 101 without interacting with the rest of the web server 107.

The web presentation servers (i.e. HTTP servers) 109 respond to http requests from clients 101 and either supply static content if available, or pass the request on to the next tier. The presentation servers 109 are typically (but not necessarily) implemented as a number of small servers operating in parallel.

The web application servers 111 provide integration business logic needed to execute the actual web application. The web application servers 111 are typically (but not necessarily) implemented as a number of small to medium servers operating in parallel.

The database servers 113 are used to process database transactions requiring a high level of reliability, such as financial transactions. The database servers 113 are typically (but not necessarily) implemented as a single large SMP (Symmetric Multi Processor) server. A second SMP server is often configured as a standby backup server.

Those of ordinary skill in the art will recognize that present invention is not limited to the web server configuration described above. For example, the three-tier web server of the exemplary environment may be combined into a two-tier or a single-tier structure. In a two-tier structure, the presentation and application tiers are implemented on a single "web tier", and the database server is implemented on a physically separate server.

Those of ordinary skill in the art will further recognize that the computer system of the present invention may be comprised of a computer with one or more computer processors, one or more external storage devices, output devices such as a computer display monitor and a printer, a textual input device such as a computer keyboard, a graphical input device such as a mouse, and a memory unit. The computer system of the present invention may be a network of interacting computer devices connected to several other computer systems through various network protocols. The computer processor is connected to the external storage device, the display monitor, the printer, the keyboard, the mouse, and the memory unit. The external storage device and the memory unit may be used for the storage of data and computer program code. The external storage device may be a fixed or hard disk drive, a floppy disk drive, a CDROM drive, a tape drive, or other device locally or remotely (e.g. via Internet) connected. The functions of the present invention are performed by the computer processor executing computer program codes, which is stored in the memory unit or the external storage device. The computer system may suitably be any one of the types that are well known in the art such as a mainframe computer, a minicomputer, a workstation, or a personal computer. The computer system may run any of a number of well known computer operating systems including IBM OS/390®, IBM AS/400®, IBM OS/2®, Microsoft Windows NT®, Microsoft Windows 2000®, and many variations of OSF UNIX.

Figure 2:
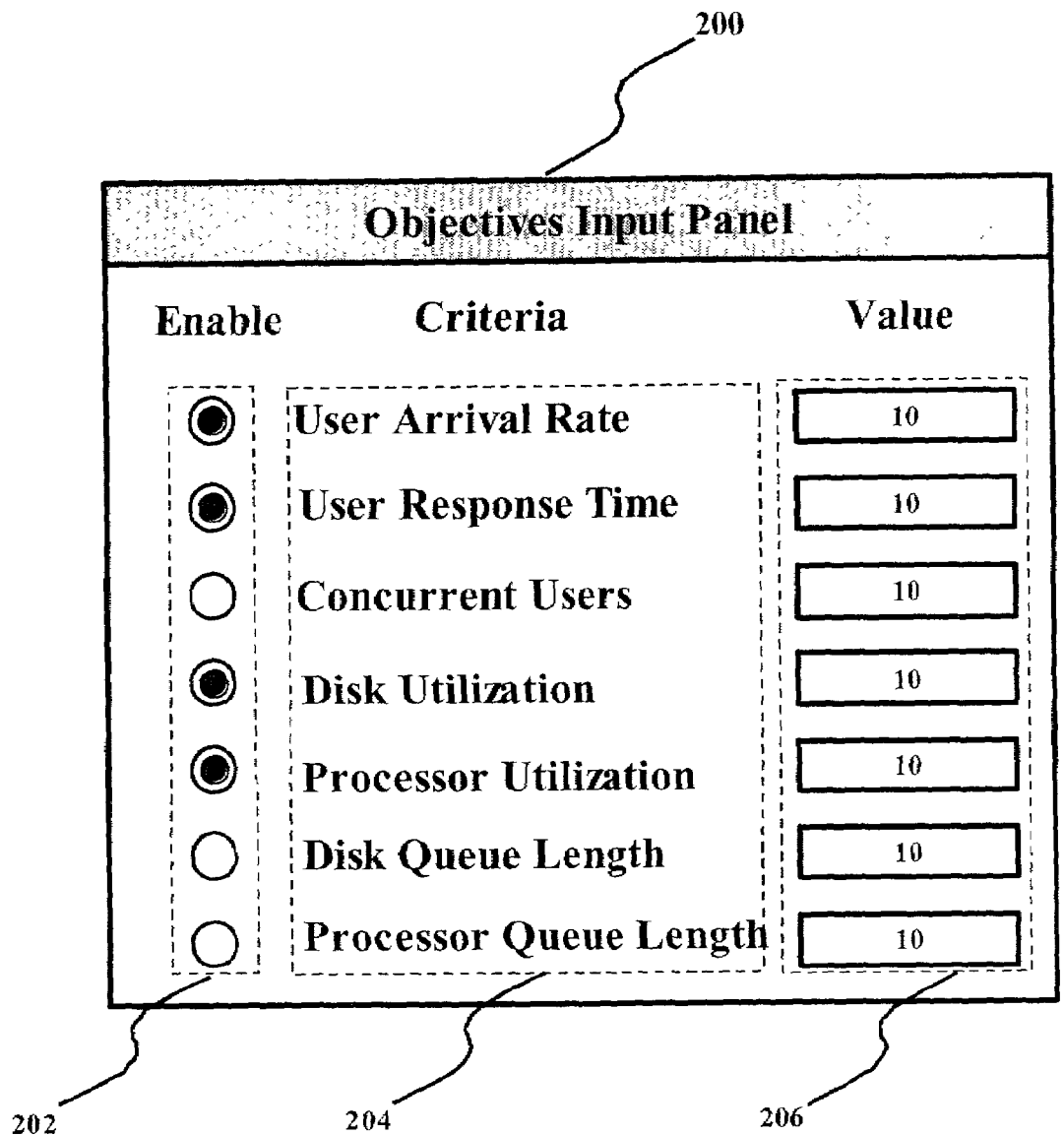
FIG. 2 illustrates the input panel used to enable and specify the values for various modeling criteria.

FIG. 2 illustrates an objectives input panel 200 from the user interface to the model that is used to enable and specify the values for various system criteria for each model run (i.e. performance calculations) for a computer system, which is being modeled. This panel contains option buttons 202 (or similar devices) which enable or disable each of the predefined system criteria (i.e. objective). At least one criterion must be enabled for the model run, though any number of multiple criteria can simultaneously be enabled. System criteria include but not limited to criteria such as the user arrival rate criterion, the user response time criterion, the number of concurrent users criterion, disk utilization and disk queue length criteria, and processor utilization and processor queue length criteria. Also on the objectives input panel, each criterion will typically include a descriptive label 204 and a value input field 206 to specify a maximum allowed value for that criterion. These fields will typically be initialized to a default value, which the model user can accept or modify.

Figure 3:
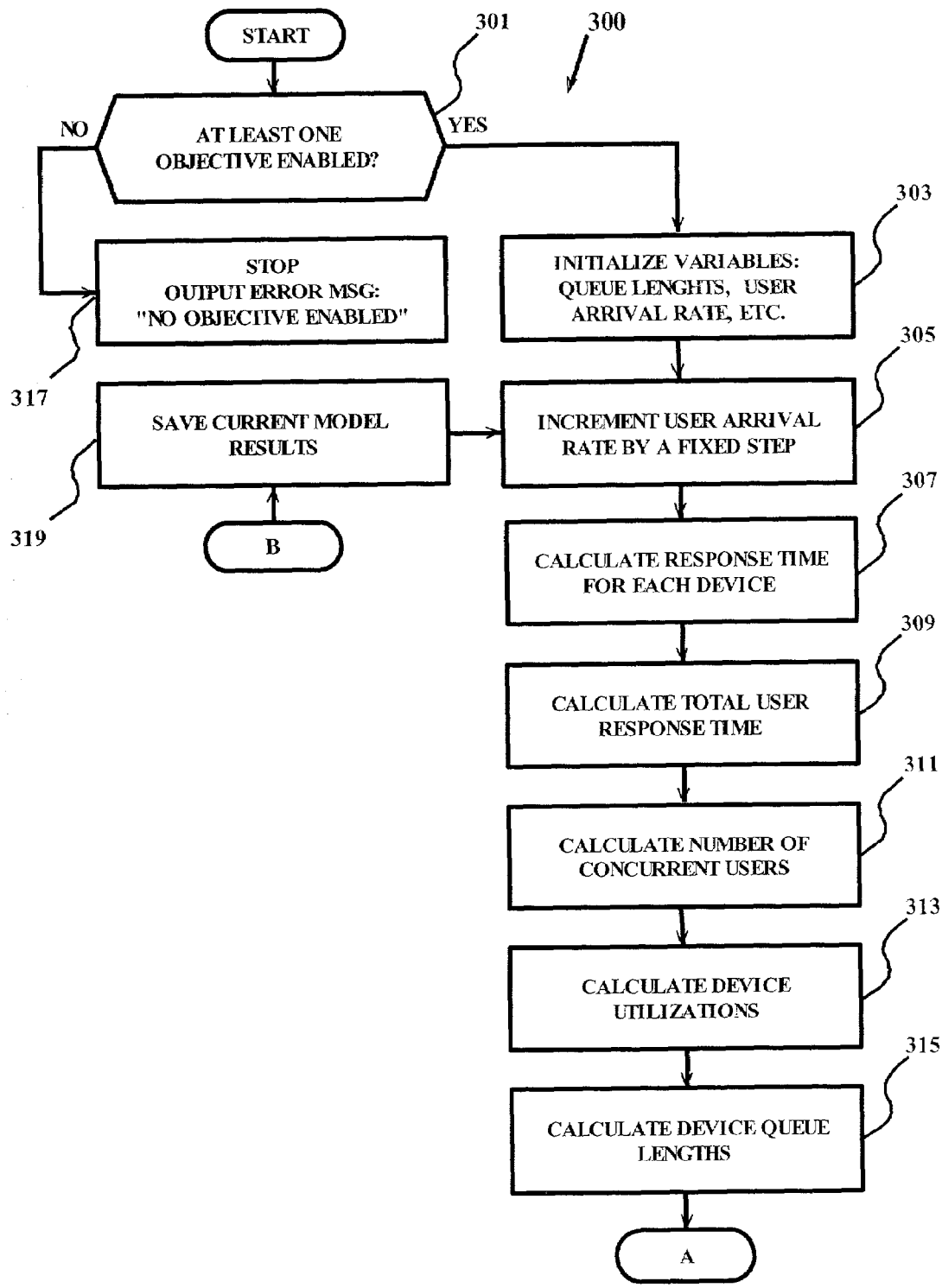
FIG. 3 illustrates a flow diagram of the steps performed to initialize the calculations and estimate system performance using a variation of the standard Mean Value Analysis methodology.

In FIG. 3, flow diagram 300 illustrates the steps performed to initialize the calculations and estimate system performance of the modeled computer system using a variation of the standard Mean Value Analysis methodology. This includes calculating the response time for a typical user interaction such as a web page visit. After the start of the procedure, it is checked at step 301, to ensure that at least one of the predefined system criteria (i.e. objective) from FIG. 2 has been enabled. If not, the model run is stopped at step 317 and an error message is output stating that "No Objective Enabled".

If at least one of the predefined system criteria (i.e. objective) has been enabled, then the variables used in the Mean Value Analysis performance calculations are initialized at step 303. This includes setting all queue lengths to zero, setting the user arrival rate to zero, and initializing to zero all the variables that are used for holding the model results. The user arrival rate is then incremented by a standard step size, such as 0.1 users per second, in step 305.

In step 307, the response times are calculated for each type of device being modeled in the system. In this embodiment, processors and disks are the two types of devices being modeled in our computer simulation. Those of ordinary skill in the art will recognize that other devices such as busses and network connections can also be modeled depending on the level of detail included in the model. The device response times are calculated using the following equations:

procRespTime=procServTime*(1+procQueLength);

diskRespTime=diskServTime*(1+diskQueLength);

Where:
procServTime=average service time for a processor service interval
diskServTime=average disk service time In step 309, the total user response time for a typical user interaction is calculated by summing up the response time for all devices in the system. This can be done using the following equation in the standard Mean Value Analysis methodology:

totalRespTime=procRespTime*procVisitRate*(number of processors)
+diskRespTime*diskVisitRate*(number of disks);

Where:
procVisitRate=the average visit rate at each processor caused by a typical user interaction in the simulation model.
diskVisitRate=the average visit rate at each disk caused by a typical user interaction in the simulation model.

In step 311, the number of concurrent users in the system is calculated by the following equation:

concurrentUsers=throughput*(totalRespTime+thinkTime)

Where:
throughput=the user arrival rate
thinkTime=a standard (or specified) think time per user for this model run In step 313, the utilization of the two device types is calculated with the following equations:

procUtilization=throughput*procVisitRate*procServTime;

diskUtilization=throughput*diskVisitRate*diskServTime;

In step 315, the new device queue lengths are calculated using the following equations:

procQueLength=throughput*procVisitRate*procRespTime;

diskQueLength=throughput*diskVisitRate*diskRespTime;

Those of ordinary skill in the art will recognize that other calculation methodologies and different order of calculations may be adopted in place of the above-described methodology and calculation order. In addition, calculation of the values for each of the predefined system criteria could be conditional subject to only those criteria, which are enabled.

Figure 4:
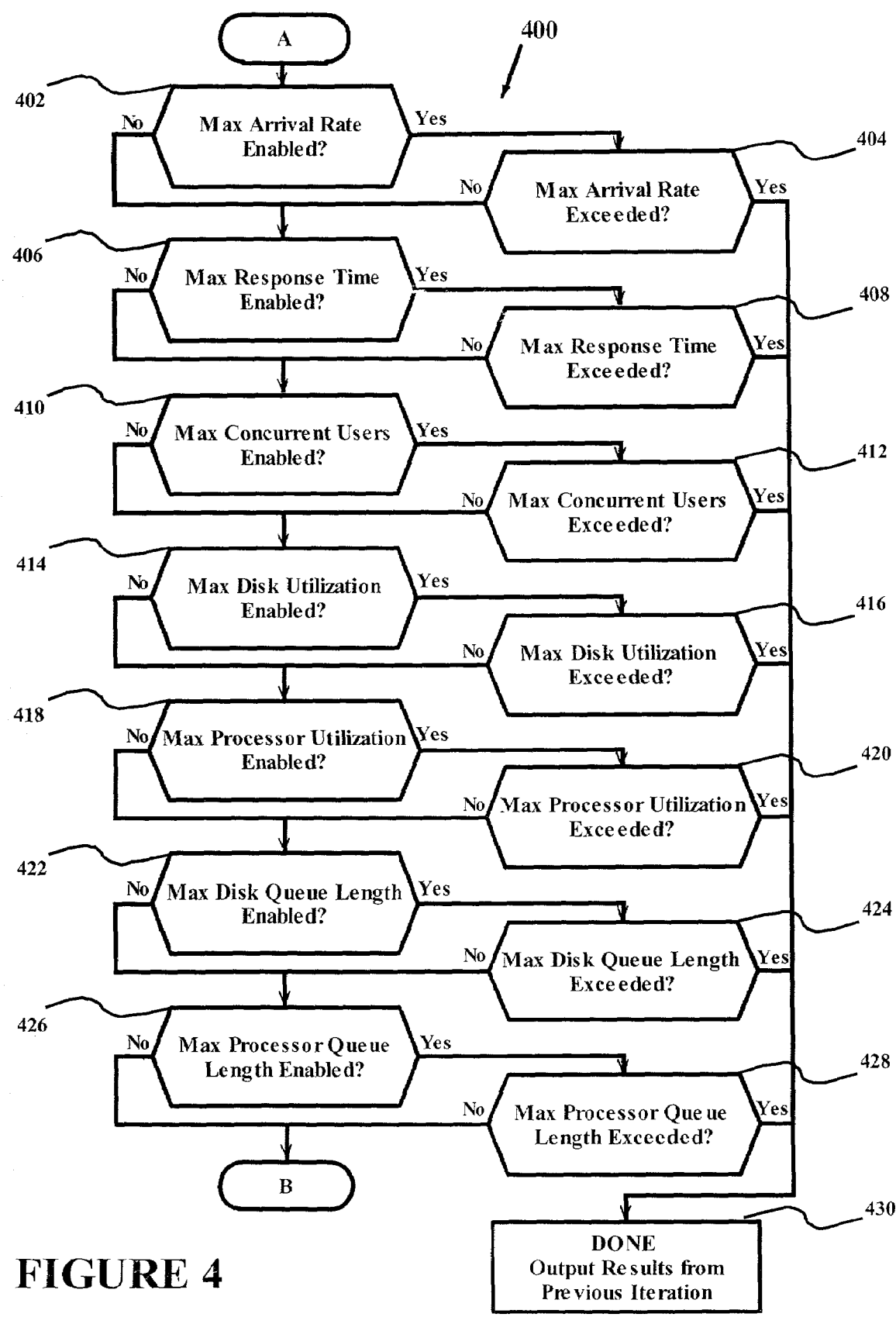
FIG. 4 illustrates a flow diagram of the steps performed to determine if all the modeling criteria are still being met.

The procedure continues with flow diagram 400 of FIG. 4. The steps in FIG. 4 are used to determine if any of the modeling objectives have been exceeded. If not, the procedure returns to the steps in FIG. 3. The results (i.e. the current user arrival rate, user response time, number of concurrent users, device queue lengths, device utilizations) from the current model iteration are saved in step 319. The procedure then continues with step 305 to increment the user arrival rate in the model by a fixed value (i.e. a constant value), such as 0.1 users per second, and proceeds to recalculate the next iteration of the model as before.

In FIG. 4, flow diagram 400 illustrates the steps performed to determine if all the modeling criteria are still being met (i.e. none have been exceeded). In step 402, it is checked to see if the "Maximum Arrival Rate" criterion (i.e. objective) is enabled. If it is not enabled, then, in step 406 the next criterion is checked to see if it is enabled. If the "Maximum Arrival Rate" criterion is enabled, then in step 404 a check is performed to see if the current arrival rate used by the model exceeds the Maximum Arrival Rate specified on the Objectives Input Panel 200 in FIG. 2. If the specified Maximum Arrival Rate has not been exceeded, then the control proceeds to check the next criterion in step 406. If the model has exceeded the specified Maximum Arrival Rate, then processing proceeds with step 430 where the model iterations are completed and the results saved (in step 319 of FIG. 3) from the previous iteration are displayed.

If the "Maximum Arrival Rate" in step 404 has not been exceeded, control proceeds to steps 406 thru 428 to perform similar tests on the other predefined model criteria. If these tests are all completed and the model iterations have not been stopped with step 430, then control returns to step 319 of FIG. 3 to proceed with the next model iteration as described previously for FIG. 3. Iterations of the model will continue with ever increasing user arrival rates until at least one of the specified modeling criteria is exceeded.

Those of ordinary skill in the art will recognize that the present invention and the algorithms described above are not limited to a specific hardware or a specific computer system. The above algorithms can be extended to more detailed modeling in a number of other ways. For example, it can be used to model a network of interacting computer devices, multi-tiered hardware systems, raid disks, paging operations, or other hardware facilities such as busses, network connections, and edge servers.

Those of ordinary skill in the art will further recognize that although the analytic modeling technique of the present invention is originally intended to model complex web sites, the methodology can be equally applied to other computer systems. The applications are defined based on the intended uses of the computer system and detailed knowledge of the workload characteristics is not necessary, although it can be used to increase the accuracy of the modeling. Using this modeling technique, typical IT infrastructures can be analyzed and related models can be developed to assist in predicting and planning how to meet future requirements.

What is claimed is:

1. A method for performing analytic modeling on a computer system by handling a plurality of predefined system criteria directed to a modeled computer system, said method comprising the steps of:
    (a) enabling one or more predefined system criteria from said plurality of predefined system criteria;
    (b) establishing a maximum allowed value for each of said enabled predefined system criteria;
    (c) initializing a plurality of variables used in mean value analysis calculations for said analytic modeling;
    (d) calculating a value for each of said enabled predefined system criteria utilizing said plurality of variables;
    (e) comparing each of said calculated values to their corresponding said maximum allowed value; and
    (f) if none of said calculated values have exceeded their corresponding said maximum allowed value, saving said calculated values; adjusting said plurality of variables and repeating steps (d) and (e) until at least one of said one or more enabled predefined system criteria has exceeded its maximum allowed value.

2. The method of claim 1, wherein said plurality of predefined system criteria comprises user arrival rate criterion, user response time criterion, number of concurrent users criterion, disk utilization criterion, disk queue length criterion, processor utilization criterion, and processor queue length criterion.

3. The method of claim 2, wherein said plurality of variables comprises a user arrival rate variable, a user think time variable, and for each device on said modeled computer system, a device queue length variable, an average device service time variable, and an average device visit rate variable.

4. The method of claim 3, wherein said calculating step comprises calculating a device response time for each device on said modeled computer system utilizing said average device service time variables and said device queue length variables.

5. The method of claim 4, wherein said value for said user response time criterion is calculated by utilizing said calculated device response times, said average device visit rate variables and number of each device on said modeled computer system.

6. The method of claim 5, wherein said value for said number of concurrent users criterion is calculated by utilizing said value for said user response time criterion, said user arrival rate variable, and said user think time variable.

7. The method of claim 6, wherein said step of adjusting includes incrementing said user arrival rate variable by a fixed value.

8. The method of claim 7, wherein said saved calculated values are displayed as model results for said analytic modeling.

9. The method of claim 8, wherein said saved calculated values are used as input for further processing.

10. The method of claim 9, wherein said computer system and said modeled computer system are the same.

11. A computer system for performing analytic modeling by handling a plurality of predefined system criteria directed to a modeled computer system, said computer system comprising:
    a computer; and
    one or more computer programs executed by said computer system for performing the steps of:
    (a) enabling one or more predefined system criteria from said plurality of predefined system criteria;
    (b) establishing a maximum allowed value for each of said enabled predefined system criteria;
    (c) initializing a plurality of variables used in mean value analysis calculations for said analytic modeling;
    (d) calculating a value for each of said enabled predefined system criteria utilizing said plurality of variables;
    (e) comparing each of said calculated values to their corresponding said maximum allowed value; and
    (f) if none of said calculated values have exceeded their corresponding said maximum allowed value, saving said calculated values; adjusting said plurality of variables and repeating steps (d) and (e) until at least one of said one or more enabled predefined system criteria has exceeded its maximum allowed value.

12. The computer system of claim 11, wherein said plurality of predefined system criteria comprises user arrival rate criterion, user response time criterion, number of concurrent users criterion, disk utilization criterion, disk queue length criterion, processor utilization criterion, and processor queue length criterion.

13. The computer system of claim 12, wherein said plurality of variables comprises a user arrival rate variable, a user think time variable, and for each device on said modeled computer system, a device queue length variable, an average device service time variable, and an average device visit rate variable.

14. The computer system of claim 13, wherein said calculating step comprises calculating a device response time for each device on said modeled computer system utilizing said average device service time variables and said device queue length variables.

15. The computer system of claim 14, wherein said value for said user response time criterion is calculated by utilizing said calculated device response times, said average device visit rate variables and number of each device on said modeled computer system.

16. The computer system of claim 15, wherein said value for said number of concurrent users criterion is calculated by utilizing said value for said user response time criterion, said user arrival rate variable, and said user think time variable.

17. The computer system of claim 16, wherein said step of adjusting includes incrementing said user arrival rate variable by a fixed value.

18. The computer system of claim 17, wherein said saved calculated values are displayed as model results for said analytic modeling.

19. The computer system of claim 18, wherein said saved calculated values are used as input for further processing.

20. The computer system of claim 19, wherein said computer system and said modeled computer system are the same.

21. An article of manufacture comprising a program storage device readable by a computer system and tangibly embodying one or more programs of instructions executable by said computer system to perform method steps for performing analytic modeling on said computer system by handling a plurality of predefined system criteria directed to a modeled computer system, said method steps comprising the steps of:
 (a) enabling one or more predefined system criteria from said plurality of predefined system criteria;
 (b) establishing a maximum allowed value for each of said enabled predefined system criteria;
 (c) initializing a plurality of variables used in mean value analysis calculations for said analytic modeling;
 (d) calculating a value for each of said enabled predefined system criteria utilizing said plurality of variables;
 (e) comparing each of said calculated values to their corresponding said maximum allowed value; and
 (f) if none of said calculated values have exceeded their corresponding said maximum allowed value, saving said calculated values, adjusting said plurality of variables and repeating steps (d) and (e) until at least one of said one or more enabled predefined system criteria has exceeded its maximum allowed value.

22. The article of manufacture according to claim 21, wherein said plurality of predefined system criteria comprises user arrival rate criterion, user response time criterion, number of concurrent users criterion, disk utilization criterion, disk queue length criterion, processor utilization criterion, and processor queue length criterion.

23. The article of manufacture according to claim 22, wherein said plurality of variables comprises a user arrival rate variable, a user think time variable, and for each device on said modeled computer system, a device queue length variable, an average device service time variable, and an average device visit rate variable.

24. The article of manufacture according to claim 23, wherein said calculating step comprises calculating a device response time for each device on said modeled computer system utilizing said average device service time variables and said device queue length variables.

25. The article of manufacture according to claim 24, wherein said value for said user response time criterion is calculated by utilizing said calculated device response times, said average device visit rate variables and number of each device on said modeled computer system.

26. The article of manufacture according to claim 25, wherein said value for said number of concurrent users criterion is calculated by utilizing said value for said user response time criterion, said user arrival rate variable, and said user think time variable.

27. The article of manufacture according to claim 26, wherein said step of adjusting includes incrementing said user arrival rate variable by a fixed value.

28. The article of manufacture according to claim 27, wherein said saved calculated values are displayed as model results for said analytic modeling.

29. The article of manufacture according to claim 28, wherein said saved calculated values are used as input for further processing.

30. The article of manufacture according to claim 29, wherein said computer system and said modeled computer system are the same.

31. A method for performing analytic modeling on a computer system, said method comprising the steps of:
 receiving from a modeling tool, a plurality of predefined system criteria directed to a modeled computer system;
 selecting one or more predefined system criteria from said plurality of predefined system criteria;
 specifying a maximum value for each of said selected one or more predefined system criteria;
 invoking said modeling tool to calculate highest values for said selected one or more predefined system criteria, whereby none of said calculated highest values exceed their corresponding said specified maximum value; and
 receiving from said modeling tool, said calculated highest values as model results.

* * * * *